(Model.)
J. G. WILSON.
HEADING, STAVE, AND SPOKE SAWING MACHINE.
No. 243,745. Patented July 5, 1881.
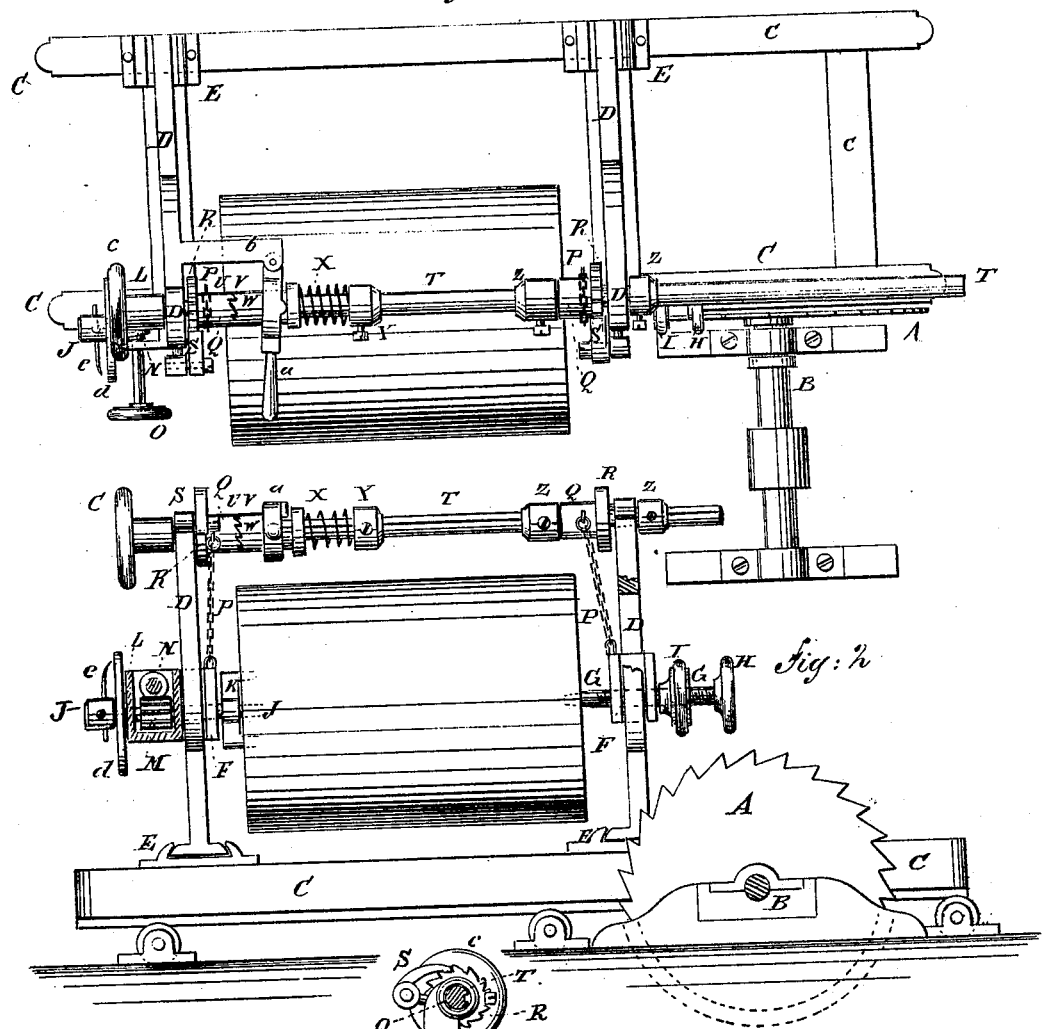
WITNESSES:
Chas. Nida
C. Sedgwick
INVENTOR:
J. G. Wilson
BY Munn & Co
ATTORNEYS.
N. PETERS. Photo-Lithographer, Washington, D. C.

UNITED STATES PATENT OFFICE.

JESSE G. WILSON, OF CLAYTON, INDIANA.

HEADING, STAVE, AND SPOKE SAWING MACHINE.

SPECIFICATION forming part of Letters Patent No. 243,745, dated July 5, 1881.

Application filed October 21, 1880. (Model.)

*To all whom it may concern:*

Be it known that I, JESSE GARRIOTT WILSON, of Clayton, in the county of Hendricks and State of Indiana, have invented a new and useful Improvement in Heading, Stave, and Spoke Sawing Machines, of which the following is a specification.

Figure 1 is a plan view of the improvement. Fig. 2 is a front elevation. Fig. 3 is an end elevation.

The object of this invention is to furnish machines for sawing logs longitudinally in the direction of their centers and to any desired depth, and which shall be so constructed that the logs can be conveniently turned and raised and lowered to bring them into proper position, and to allow one tier after another to be removed from the outer parts of the logs until the logs become too small for farther sawing.

Similar letters of reference indicate corresponding parts.

A represents a circular saw, the mandrel B of which revolves in bearings attached to the frame of the saw-mill in the ordinary manner.

C is the carriage, which is constructed and operated in the ordinary manner to carry a log forward to the saw A.

D are head-stocks, which are secured to the carriage C by shoes E or other suitable means. One of the head-stocks D is stationary and the other is movable, so that it can be adjusted as the length of the log to be sawed may require. The upper parts of the forward or upright arms of the head-stocks D are slotted vertically to receive the sliding bearings F, and are made with forward offsets to bring the central line of their slots into the plane of the saw A, so that the cut of the saw will be in the direction of the center of the log. One of the sliding bearings F has a horizontal screw-hole formed through it to receive the screw-point G, that carries one end of the log, and which is provided with a hand-wheel, H, for convenience in operating it, and with a jam-nut, I, to prevent it from working loose. The other sliding bearing F has a horizontal hole formed through it to receive the point J, which is provided at its forward end with a cross-head dog or clutch, K, to engage with the end of the log, so that the said log will be turned upon its center by turning the said clutch-point J K.

To the point J, within a box, L, formed upon or attached to the outer side of the sliding bearing F, is attached, or upon it is formed, a worm-wheel, M, the teeth of which engage with the threads of a worm, N. The worm N is pivoted to the sides of the box L, and to the projecting end of one of its journals is attached a hand-wheel, O, for convenience in turning the said worm to adjust the log for another cut.

To the inner parts of the sliding bearings F are attached the ends of two chains or cords, P, the upper ends of which are attached to two sleeves, Q.

To the sleeves Q are attached, or upon them are formed, ratchet-wheels R, with the teeth of which engage pawls S, pivoted to the upper ends of the head-stocks D, or to supports formed upon or attached to the said head-stocks. The sleeves Q are placed upon a rod or shaft, T, which works in bearings formed in or attached to the upper ends of the head-stocks D, and which has a longitudinal groove formed in it to receive a set-screw, pin, or tongue attached to or formed upon the forward sleeve Q. The inner end of the rear sleeve Q has clutch-teeth U formed upon it, to engage with the clutch-teeth V formed upon the end of the sleeve W, placed upon the rod T, and held forward against the sleeve Q by a spiral spring, X, also placed upon the rod T. One end of the spiral spring X rests against the end of the sleeve W, and its other end rests against the collar Y, placed upon the rod T and secured in place adjustably by a set-screw. The forward sleeve Q is kept in place upon the rod T, and the rod T is kept from moving longitudinally in its bearings by the collars Y, placed upon the said rod and secured in place adjustably by set-screws. The clutch-sleeve W is drawn back from the sleeve Q by a lever, *a*, pivoted to an arm, *b*, formed upon or attached to the upper end of the head-stock D. The lever *a* rests upon the sleeve W and bears against a flange formed around the end of the said sleeve W, so that the clutch-sleeve W can be drawn back from the ratchet-sleeve Q by operating the lever *a*, and will be forced forward into gear with the said ratchet-sleeve Q as soon as the lever *a* is released by the spiral spring X.

To the end of the rod T is attached a hand-wheel, *c*, for convenience in turning it.

To the outer side of the box L is attached a circular plate, d, upon the outer side of which are formed a number of concentric scales of division-marks, each of which has as many spaces or division-marks as it may be desired to form saw-cuts in the periphery of the log.

e is a pointer, which passes through a hole in the end of the point J, so that it will be carried around by and with the said point in its revolution. The pointer e is secured in place in the point J by a set-screw, so that it can be adjusted to bring its index end opposite the scale of division-marks that indicate the number of pieces into which the perimeter of the log is to be cut.

In using the machine the log to be sawed is centered and rolled upon the carriage. The sliding bearings F are lowered to bring the points G J opposite the centers of the ends of the log. The points G J are then entered at the centers of the ends of the log, and the point G is screwed up to cause the dogs K to engage with the other end of the log, and is then secured by the jam-nut I. The rod T is then turned to bring the log into such a position that the saw A will cut a kerf to the required depth. In case the lower side of the log is not level it can be leveled by means of the rod T and the ratchets, pawls, and clutch connected with the said rod. When one kerf has been cut the log is backed off the saw and the log is turned by operating the worm-gearing until the index end of the pointer e comes opposite the next division-mark of the scale. When the log has been turned through a complete revolution it is taken out of the machine and the pieces between the kerfs split off; or the pieces between the kerfs can be split off without removing the log from the machine. When the log is large, one or more tiers of heading can be taken off, then one or more tiers of staves, and then one or more tiers of spokes; or the whole log can be cut up into the smaller pieces, if desired. After the pieces have been split from the log they are taken to a heading-machine, a stave-machine, or a spoke-machine, as the case may be, and worked into proper shape.

Having thus fully described my invention, I claim as new and desire to secure by Letters Patent—

1. In a heading, stave, and spoke sawing machine, the combination, with the head-stocks D and the bearings F, carrying the points G J, of the chains P, the sleeves Q, the rod T, and the ratchet-wheels R and pawls S, substantially as herein shown and described, whereby the log can be readily raised and lowered and securely held, as set forth.

2. In a heading, stave, and spoke sawing machine, the combination, with the rod T and the sleeve Q, connected with the sliding bearing F by the chain P, and held from turning back by the ratchet R and pawl S, of the clutch W, the spring X, and the lever a, substantially as herein shown and described, whereby the sleeve Q can be connected with and disconnected from the rod T to level the log, as set forth.

JESSE GARRIOTT WILSON.

Witnesses:
W. H. RAGAN,
LORENZO D. JOHNSON.